(12) United States Patent
Choi et al.

(10) Patent No.: US 8,885,347 B2
(45) Date of Patent: Nov. 11, 2014

(54) MOBILE TERMINAL

(75) Inventors: Kyungseon Choi, Gyeoggi-Do (KR);
Gihoon Tho, Seoul (KR); Jaeeon Lee,
Gyeoggi-Do (KR)

(73) Assignee: LG Electronics Inc., Seoul (KR)

( * ) Notice: Subject to any disclaimer, the term of this patent is extended or adjusted under 35 U.S.C. 154(b) by 359 days.

(21) Appl. No.: 13/288,103

(22) Filed: Nov. 3, 2011

(65) Prior Publication Data

US 2012/0314350 A1 Dec. 13, 2012

(30) Foreign Application Priority Data

Jun. 7, 2011 (KR) .................. 10-2011-0054720

(51) Int. Cl.
*H05K 7/00* (2006.01)
*H04M 1/02* (2006.01)

(52) U.S. Cl.
CPC ............ *H04M 1/0202* (2013.01); *H04M 1/026* (2013.01); *H04M 1/0283* (2013.01)
USPC ........................................................ 361/728

(58) Field of Classification Search
USPC .............................. 361/600, 679.01, 728–730
See application file for complete search history.

(56) References Cited

U.S. PATENT DOCUMENTS

| | | | |
|---|---|---|---|
| 8,553,396 B2* | 10/2013 | Chiu et al. | 361/679.01 |
| 8,624,113 B2* | 1/2014 | Ho | 174/50 |
| 2012/0162929 A1* | 6/2012 | Huang | 361/728 |

FOREIGN PATENT DOCUMENTS

| | | |
|---|---|---|
| JP | 5-165014 A | 6/1993 |
| JP | 2008-76595 A | 4/2008 |

OTHER PUBLICATIONS

Machine translation of Applicant Cited Prior Art JP 5-165014-A.*
Machine translation of Applicant Cited Prior Art JP 2008-76595-A.*

* cited by examiner

*Primary Examiner* — Bernard Rojas
(74) *Attorney, Agent, or Firm* — Birch, Stewart, Kolasch & Birch, LLP (57) ABSTRACT

A mobile terminal includes a first member disposed on an inner or outer surface of a terminal body, a second member adjacent to the first member and having a gap formed between the first and second members, a filler configured to fill the gap so as to block the gap, and a cover layer configured to cover the first member, the second member and the filler.

12 Claims, 10 Drawing Sheets

MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2011-0054720, filed on Jun. 7, 2011, the contents of which is incorporated by reference herein in its entirety.

BACKGROUND OF THE INVENTION

1. Field of the Invention

This specification relates to a mobile terminal, and particularly, to a mobile terminal having a blocked gap between different members.

2. Description of Related Art

In general, a terminal may be classified into a mobile (portable) terminal and a stationary terminal according to a moveable state. The mobile terminal may be also classified into a handheld terminal and a vehicle mount terminal according to a user's carriage method.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

Various attempts have been made to implement complicated functions in such a multimedia device by means of hardware or software. For instance, a User Interface (UI) environment is provided in a mobile terminal to enable a user to easily and conveniently search for or select a desired function among available function.

Furthermore, being proposed a mobile terminal having a simpler and integrated configuration for hardware implementation. Accordingly, may be considered a structure to block a gap formed between different members.

BRIEF SUMMARY OF THE INVENTION

Therefore, an aspect of the detailed description is to provide a structure to block a gap formed between different members.

Another aspect of the detailed description is to provide a mobile terminal having a simpler and integrated configuration.

To achieve these and other advantages and in accordance with the purpose of this specification, as embodied and broadly described herein, a mobile terminal includes a first member disposed on an inner or outer surface of a terminal body, a second member adjacent to the first member and having a gap formed between the first and second members, a filler configured to fill the gap so as to block the gap, and a cover layer configured to cover the first member, the second member and the filler.

According to one embodiment of the present invention, at least one of the first and second members may be provided with an inclined surface having a predetermined inclined angle toward the gap such that the filler is moveable to the gap. The inclined surface may be extending from a surface which forms the gap, and the filler may be disposed to cover the inclined surface.

According to another embodiment of the present invention, the filler may include at least one organic material selected from an organic group including gel, lake and compound. Alternatively, the filler may include at least one inorganic material selected from an inorganic group including metal, grift and rubber.

According to another embodiment of the present invention, the filler may be formed of a plurality of particles laminated on the gap so as to block the gap. The plurality of particles may have different sizes such that a porosity of the gap is minimized. Also, the plurality of particles may be formed in a spherical shape so as to be moveable to the gap. The plurality of particles may be formed of a magnetic material having an attractive force therebetween.

According to another embodiment of the present invention, the cover layer may include a base layer disposed to cover the first member, the second member and the filler, a color layer disposed to cover the base layer and implementing a color of the cover layer, a primer layer disposed between the base layer and the color layer so as to enhance an adhesive force of the color layer onto the base layer, and a top layer disposed to cover the color layer so as to protect the cover layer. The base layer may be formed to fill air gaps formed between the plurality of particles.

According to another embodiment of the present invention, the first and second members may consist of first and second housings for accommodating components therein, respectively. And, the filler may be filled in the gap so as to block the gap between the first and second housings.

According to another embodiment of the present invention, the first member may be implemented as a window disposed to cover a display, the second member may be implemented as a casing for accommodating the window therein, and the filler may be filled in the gap so as to block the gap between the window and the casing.

According to another embodiment of the present invention, the first member may be implemented as a casing which forms a space for accommodating components therein, the second member may be implemented as a coupling member coupled to the casing, and the filler may be formed to cover a gap between the casing and the coupling member, and to cover the coupling member.

According to another aspect of the present invention, a mobile terminal includes a first member disposed on an inner or outer surface of a terminal body, a second member adjacent to the first member and having a gap formed between the first and second members, a filler configured to fill the gap so as to block the gap, and a cover layer coupled to the first member and the filler, and disposed to cover the first member and the filler.

According to one embodiment of the present invention, the first member may be provided with an inclined surface having a predetermined inclined angle toward the gap such that the filler is moveable to the gap.

According to another embodiment of the present invention, the filler may be configured to cover a surface which forms the gap of the second member.

According to another embodiment of the present invention, the first member, the second member and the cover layer may be configured to form the same plane.

According to another embodiment of the present invention, the first and second members may be formed to have a step from each other, and the cover layer may be configured to cover up to a virtual extended line which connects end portions of the first and second members to each other.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention. In the drawings.

DETAILED DESCRIPTION OF THE INVENTION

Hereinafter, a mobile terminal according to the present invention will be explained in more detail with reference to the attached drawings Description will now be given in detail of the exemplary embodiments, with reference to the accompanying drawings. For the sake of brief description with reference to the drawings, the same or equivalent components will be provided with the same reference numbers, and description thereof will not be repeated.

The suffixes attached to components of the mobile terminal, such as 'module' and 'unit or portion' were used for facilitation of the detailed description of the present invention. Therefore, the suffixes do not have different meanings from each other.

The mobile terminal according to the present invention may include a portable phone, a smart phone, a notebook computer (laptop computer), a digital broadcast terminal, a PDA (Personal Digital Assistants), a PMP (Portable Multimedia Player), an E-book), a navigation system, etc.

Figure 1:
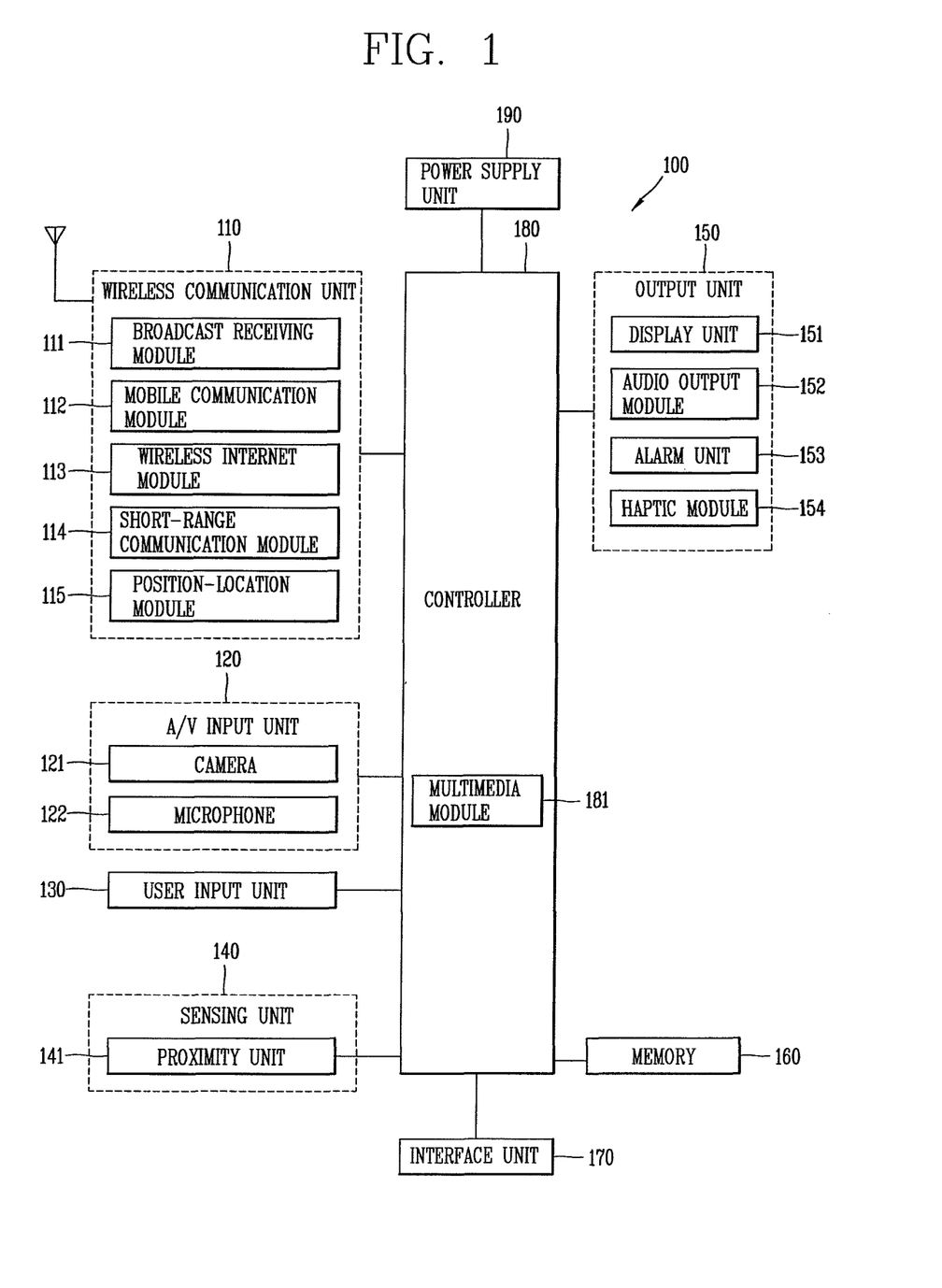
FIG. 1 is a block diagram of a mobile terminal according to one embodiment of the present invention.

FIG. 1 is a block diagram of a mobile terminal 100 according to one embodiment of the present invention.

The mobile terminal 100 may comprise components, such as a wireless communication unit 110, an Audio/Video (A/V) input unit 120, a user input unit 130, a sensing unit 140, an output module 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position information module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

The broadcast associated information may indicate information relating to broadcast channels, broadcast programs or broadcast service providers. Further, the broadcast associated information may be provided via a mobile communication network and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The wireless internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position information module 115 denotes a module for detecting or calculating a position of a mobile terminal. An example of the position information module 115 may include a Global Position System (GPS) module.

Referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video (telephony) call mode or a capturing mode. The processed image frames may be displayed on a display unit 151.

The image frames processed by the camera 121 may be stored in the memory 160 or transmitted to the exterior via the wireless communication unit 110. Two or more cameras 121 may be provided according to the use environment of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the orientation of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply unit 190, the presence or absence of a coupling or other connection between the interface unit 170 and an external device and the like. Moreover, the sensing unit 140 may include a proximity sensor 141.

The output unit 150 is configured to output an audio signal, a video signal or an alarm signal. The output unit 150 may include a display unit 151, an audio output module 152, an alarm unit 153, a haptic module 154, etc.

The display unit 151 may output information processed in the mobile terminal 100. For example, when the mobile terminal is operating in a phone call mode, the display unit 151 will provide a User Interface (UI) or a Graphic User Interface (GUI) which includes information associated with the call. As another example, if the mobile terminal is in a video call mode or a capturing mode, the display unit 151 may additionally or alternatively display images captured and/or received, UI, or GUI.

Here, if the display unit 151 and a touch pad have a layered structure therebetween to constitute a touch screen, the display unit 151 may be used as an input device rather than an output device. The display unit 151 may include at least one of a Liquid Crystal Display (LCD), a Thin Film Transistor-Liquid Crystal Display (TFT-LCD), an Organic Light-Emitting Diode (OLED), a flexible display and a three-dimensional (3D) display.

Some of these displays may be configured to be transparent or transmissive so that outside may be seen therethrough, which may be referred to as a transparent display. A representative example of this transparent display may include a transparent organic light emitting diode (TOLED), etc. The rear surface portion of the display unit 151 may also be implemented to be optically transparent. Under this configuration, a user can view an object positioned at a rear side of a body through a region occupied by the display unit 151 of the body.

The display unit 151 may be implemented in two or more in number according to a configured aspect of the mobile terminal 100. For instance, a plurality of displays may be arranged on one surface integrally or separately, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the mobile terminal covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor 141 detects a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, and the like. In addition to video or audio signals, the alarm unit 153 may output signals in a different manner, for example, to inform about an occurrence of an event. For example, the alarm unit 153 may output a signal in the form of vibration. When a call signal is received or a message is received, the alarm unit 153 may vibrate the mobile terminal through a vibration means. Or, when a key signal is inputted, the alarm unit 153 may vibrate the mobile terminal 100 through a vibration means as a feedback with respect to the key signal input. Through the vibration, the user may recognize the occurrence of an event. A signal for notifying about the occurrence of an event may be output to the display unit 151 or to the audio output module 152.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100. The haptic module 154 may be provided to a place which is frequently in contact with the user. For example, the haptic module 154 may be provided to a steering wheel, a gearshift, a lever, a seat, and the like.

The memory 160 may store software programs used for the processing and controlling operations performed by the controller 180, or may temporarily store data (e.g., a map data, phonebook, messages, still images, video, etc.) that are inputted or outputted.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Figure 2:
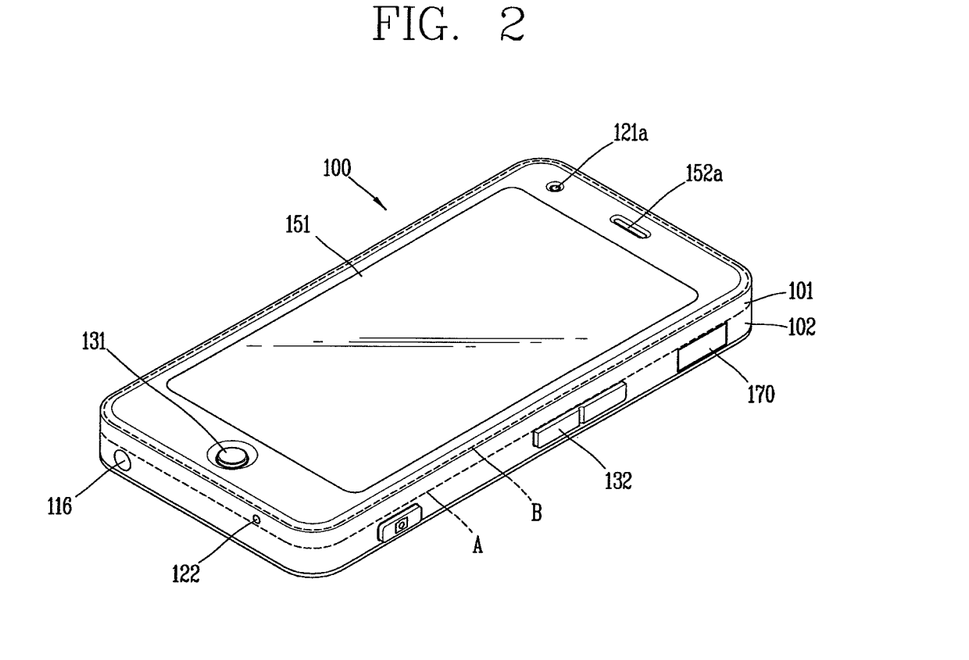
FIG. 2 is a front perspective view of a mobile terminal according to the present invention.

FIG. 2 is a front perspective view of the mobile terminal 100 according to the present invention.

The mobile terminal 100 is provided with a bar type terminal body. However, the present invention may not be limited to this bar type of mobile terminal, but may be applied to various types such as a slide type where two or more bodies are coupled to each other so as to perform a relative motion, a folder type, a swing type, a swivel type, etc.

The appearance of the mobile terminal 100 is implemented by a case (casing, housing, cover, etc.). The case may be formed by a front case 101 and a rear case 102. Each type of electronic components are mounted to a space formed by the front case 101 and the rear case 102. One or more intermediate cases may be provided between the front case 101 and the rear case 102.

The cases may be formed by injection-molding synthetic resin, or formed using metallic material such as stainless steel (STS), aluminum (Al) and titanium (Ti).

At the terminal body, may be disposed the display unit 151, an audio output unit 152a, a camera 121a, user input units 130/131, 132, the microphone 122, the interface unit 170, etc.

The display unit 151 may be disposed to occupy most parts of a main surface of the front case 101. On a region adjacent to one end of the display unit 151, disposed are the sound output module 152' and the camera 121a. On a region adjacent to another end of the display unit 151, disposed are the user input unit 131 and the microphone 122. The user input unit 132, the interface unit 170, etc. may be disposed on side surfaces of the front case 101 and the rear case 102.

The user input unit 130 is manipulated to receive a command for controlling the operation of the mobile terminal 100, and may include a plurality of manipulation units 131 and 132. The manipulation units 131 and 132 may be referred to as manipulating portions, and may include any type of ones that can be manipulated in a user's tactile manner.

The first and second manipulation units 131 and 132 may be set to receive inputs in various manners. For instance, the first manipulation unit 131 may be configured to input commands such as START, END, and SCROLL, and the second manipulation unit 132 may be configured to input commands such as controlling a volume of a sound outputted from the audio output module 152a, or converting a mode of the display unit 151 into a touch recognition mode.

Figure 3:
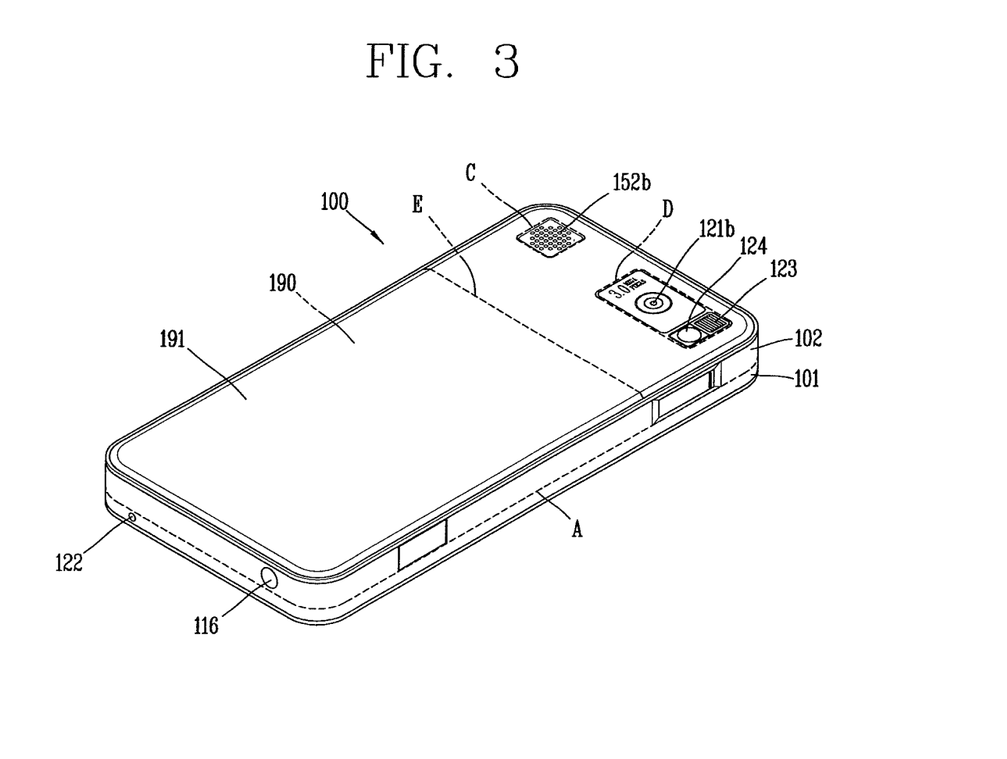
FIG. 3 is a rear perspective view of the mobile terminal of FIG. 2.

FIG. 3 is a rear perspective view of the mobile terminal 100 of FIG. 2.

Referring to FIG. 3, a camera 121b may be additionally mounted to a rear surface of the terminal body, i.e., the rear case 102. The camera 121b faces a direction which is opposite to a direction faced by the camera 121a (refer to FIG. 2), and may have pixels different from those of the camera 121a.

For example, the camera 121a may operate with relatively lower pixels (lower resolution). Thus, the camera 121a may be useful when a user can capture his or her face and send it to a calling party in a video call mode or the like. On the other hand, the camera 121b may operate with a relatively higher pixels (higher resolution) such that it can be useful for a user to obtain higher quality pictures for later use. The cameras 121a and 121b may be installed at the terminal body so as to be rotated or popped-up.

A flash 123 and a mirror 124 may be additionally disposed adjacently to the camera 121b. When capturing an object by using the camera 121b, the flash 123 provides light to the object. The mirror 124 can cooperate with the camera 121b to allow a user to photograph himself or herself in a self-portrait mode.

An audio output unit 152b may be additionally disposed on the rear surface of the terminal body. The audio output module 152b may implement a stereo function together with the audio output module 152a (refer to FIG. 2), and may be used for calling in a speaker phone mode.

A broadcast signal receiving antenna 116 as well as an antenna for calling may be disposed on a side surface of the terminal body. The broadcast signal receiving antenna 116 of the broadcast receiving module 111 (refer to FIG. 1) may be configured to retract into the terminal body.

The power supply unit 190 for supplying power to the mobile terminal 100 is mounted to the terminal body. The power supply unit 190 may be mounted in the terminal body, or may be detachably mounted to an outer surface of the terminal body.

Figure 4:
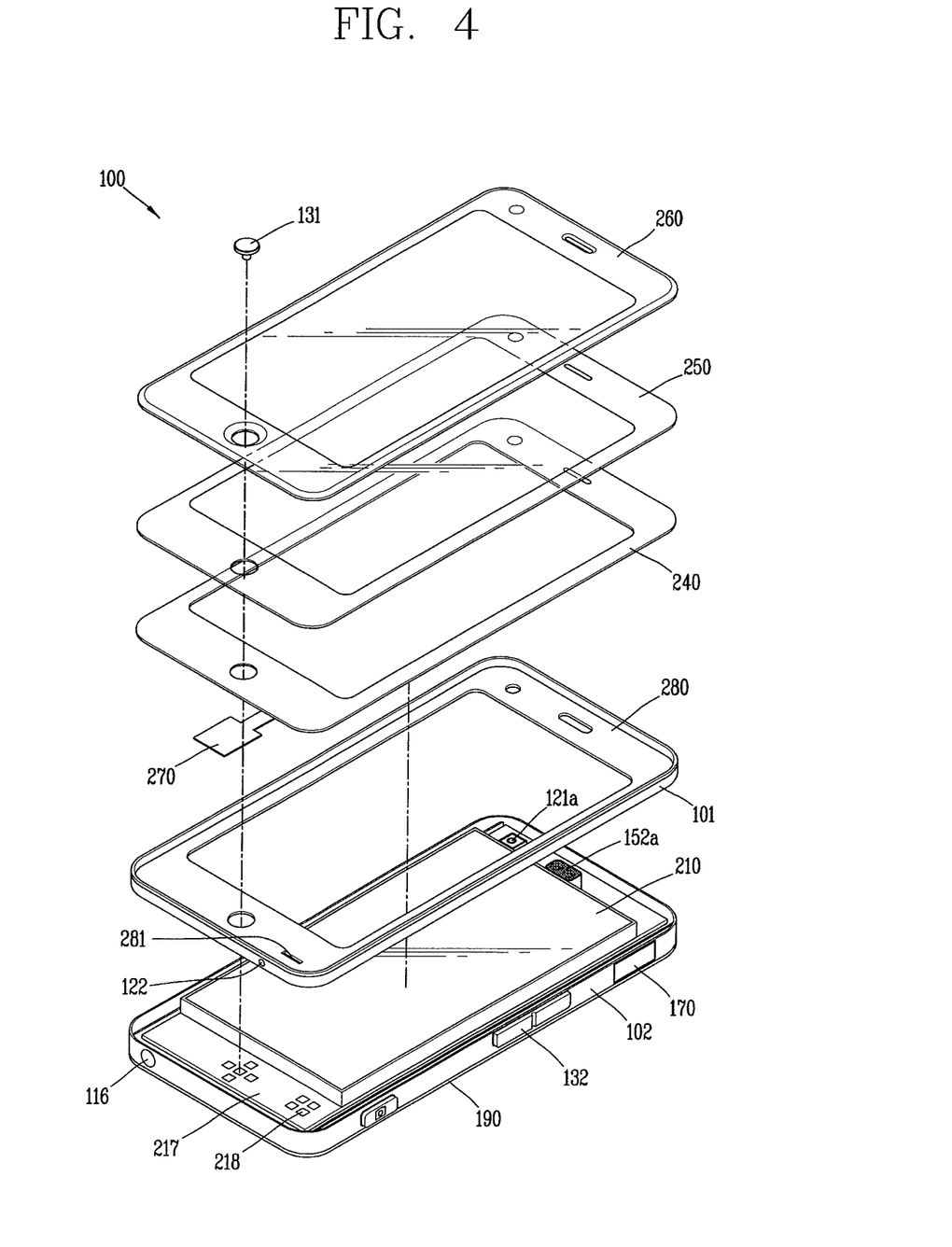
FIG. 4 is an exploded perspective view of the mobile terminal of FIG. 2.

FIG. 4 is an exploded perspective view of the mobile terminal 100 of FIG. 2, which illustrates a configuration of the display unit 151 of the mobile terminal 100 having a touch sensor 240.

Referring to FIG. 4, a printed circuit board (PCB) 217 is mounted to the rear case 102. The PCB 217 may be implemented as one example of the controller 180 (refer to FIG. 1) for operating each type of functions of the mobile terminal 100. As shown, the audio output module 152a, the camera 121a, etc. may be mounted to the PCB 217.

A display 210 electrically connected to the PCB 217 is disposed on one surface of the PCB 217. The display 210 may have an area corresponding to a region of the window where light is transmissive. Under this configuration, a user may recognize visual information outputted from the display 210 from the outside.

A mounting portion 280 having a recessed shape is formed on one surface of the front case 101. The mounting portion 280 may have an area corresponding to a touch sensor assembly such that the touch sensor assembly is mounted therein. The mounting portion 280 may be provided with holes corresponding to the audio output module 152a and the camera 121, respectively.

A through hole 281 for passing a flexible printed circuit board (FPCB) 270 therethrough is formed at the mounting portion 280. The through hole 281 may be formed at one end portion of the mounting portion 280, e.g., an end portion of a bottom surface or a lateral surface of the mounting portion 280. The FPCB 270 electrically connects a touch sensor assembly disposed on one surface of the mounting portion 280 to the PCB 217 disposed on another surface of the mounting portion 280, via the through hole 281.

The touch sensor assembly includes a touch sensor 240 configured to sense a touch input, and a window 250 disposed on one surface of the touch sensor 240.

The touch sensor 240 is mounted on one surface of the window 250, and on an upper surface of the display 210. The touch sensor 240 may be formed to be transmissive such that an image on the display 210 is viewable. A region of the touch sensor 240 corresponding to a region of the window 250 where light is transmissive forms an input region. The touch sensor 240 is configured to convert a change of a charging amount, etc. occurring on a specific part into an electric input signal.

The window 250 is coupled to one surface of the touch sensor 240. The window 250 may be formed of a transmissive material, e.g., a transmissive synthetic resin, a reinforcing glass, etc. And, the window 250 may include a non-transmissive region.

A touch film 260 may be disposed on an upper surface of the touch sensor 240. The touch film 260 may be formed of a transmissive material such as PC (Polycarbonate) and PET (Polyethylene Terephthalate). And, the touch film 260 may include a non-transmissive region. As shown, the touch film 260 may be formed such that a central region thereof corresponding to the display 210 is transparent, and an edge region thereof is opaque.

At each one end of the touch sensor 240, the window 250 and the touch film 26, may be formed a sound hole corresponding to the audio output module 152a, and an image window corresponding to the camera 121a. The image window may be additionally formed of a transmissive material. Alternatively, the image window may be integrally formed with the touch sensor 240, the window 250 and the touch film 260.

As shown in FIGS. 2 to 4, the mobile terminal 100 is provided with a plurality of members disposed internally or externally. Here, one member is arranged to be adjacent to another member. The members have rounded end portions due to a molding process, except for a case that they are formed by a cutting process. Therefore, a gap is formed between the members, resulting in a parting line.

For instance, gaps are formed between the front case 101 and the rear case 102 (part 'A'), between the front case 101 and the touch sensor assembly (part 'B'), between the rear case 102 and the audio output module 152b (part 'C'), between the rear case 102 and the camera 121b (part 'D') and between the rear case 102 and a battery cover 191 (part 'E').

Hereinafter, will be explained a structure to block gaps formed between different members.

Figure 5:
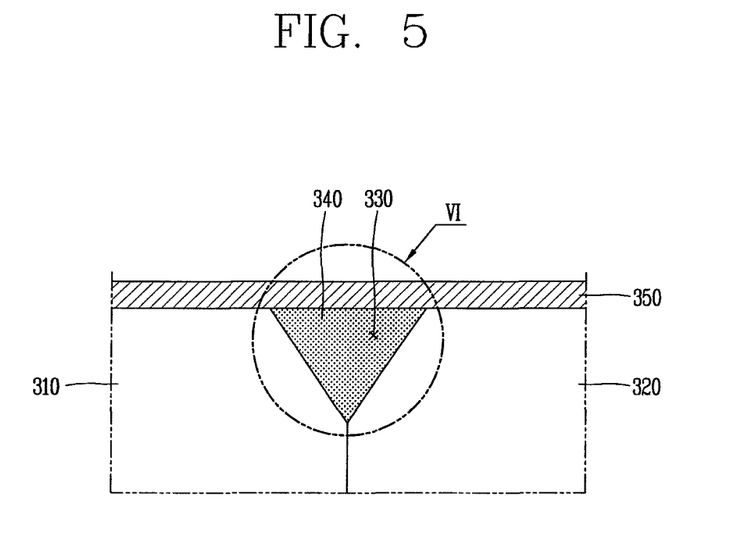
FIG. 5 is a sectional view illustrating one example of parts, A~D in FIGS. 2 and 3.

FIG. 5 is a sectional view illustrating one example of parts 'A~D' in FIGS. 2 and 3.

Referring to FIG. 5 together with FIGS. 2 and 3, first and second members 310 and 320 are disposed at an inner or outer side of the terminal body. For instance, the first and second members 310 and 320 may be implemented as the front and rear cases 101 and 102 which form the appearance of the terminal body. The second member 320 is arranged to be adjacent to the first member 310, and a gap 330 is formed between the first member 310 and the second member 320.

A filler 340 is filled in the gap 330 formed between the first and second members 310 and 320 so as to block the gap 330. The filler 340 is filled in the gap 330 to reduce a width and a depth of the gap 330. As a result, the gap 330 may be blocked, and a parting line may be less revealed.

The filler 340 may include at least one organic material selected from an organic group having gel, lake and compound. The organic material may be cross-linked gel polymer, azo-lake, triphenylmethane-lake, barium-lake, prepreg, etc.

Alternatively, the filler 340 may include at least one inorganic material selected from an inorganic group having metal, grift and rubber. The inorganic material may be metal nano particles such as Al, Mg, Zn and Ag, grift such as silica, calcite and alumina, neoprene, styrene-butadiene rubber, natural rubber, etc.

The cover layer 350 is arranged to cover the first member 310, the second member 320 and the filler 340. The cover layer 350 processes surfaces of the first and second members 310 and 320, and covers the filler 340, thereby smoothly implementing a surface connected from the first member 310 to the filler 340 and the second member 320, sequentially.

Figure 6:
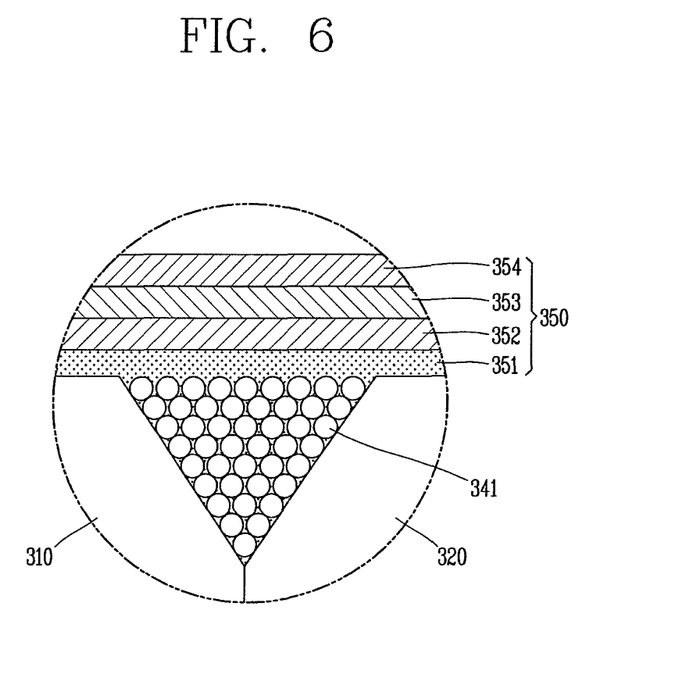
FIG. 6 is an enlarged view of a part 'VI' in FIG. 5.

FIG. 6 is an enlarged view of part 'VI' in FIG. 5.

Referring to FIG. 6, the filler 340 may be formed of a plurality of particles 341 filled in the gap 330 so as to block the gap 330 formed between the first and second members 310 and 320. For instance, a plurality of metallic nano particles 341 may be filled in the gap 330.

The plurality of particles 341 may be formed to have a specific shape and size. The plurality of particles 341 may be formed to have the same shape and size, or different shapes and sizes. When the plurality of particles 341 have different shapes and sizes, a porosity may be minimized.

The cover layer 350 includes a base layer 351, a primer layer 352, a color layer 353 and a top layer 354.

The baser layer 351 is disposed to cover the first member 310, the second member 320 and the filler 340. The base layer 351 may be configured to block air gaps between the plurality of particles 341.

The base layer 351 includes an organic polymer and a solvent. The organic polymer is coupled to the first member 310, the second member 320 and the filler 340. And, the organic polymer is dissolved by a solvent thus to be uniformly distributed to the gap 330.

The base layer 351 may include a pigment for implementing a color of the base layer 351, and additives for processing the surfaces of the first and second members 310 and 320. The additives may include at least one material having a removal function of removing colors of the first and second members 310 and 320, an anti-yellowing function of preventing discolorations, etc.

The primer layer 352 is arranged to cover the base layer 351. The primer layer 352 protects the surfaces of the first and second members 310 and 320 from corrosions or physical impacts, and enhances an adhesive force with a subsequent coating layer, e.g., the color layer 353.

The color layer 353 is arranged to cover the primer layer 352, and includes a pigment for implementing a color of the cover layer 350. The color layer 353 may be formed to have the same color as the first and second members 310 and 320 such that a parting line is not revealed and the first and second members 310 and 320 looks like one member.

The top layer 354 is arranged to cover the color layer 353 so as to protect the cover layer 350. For instance, the top layer 354 may be a UV hardened layer formed of a material hardened through UV irradiation.

Figure 7:
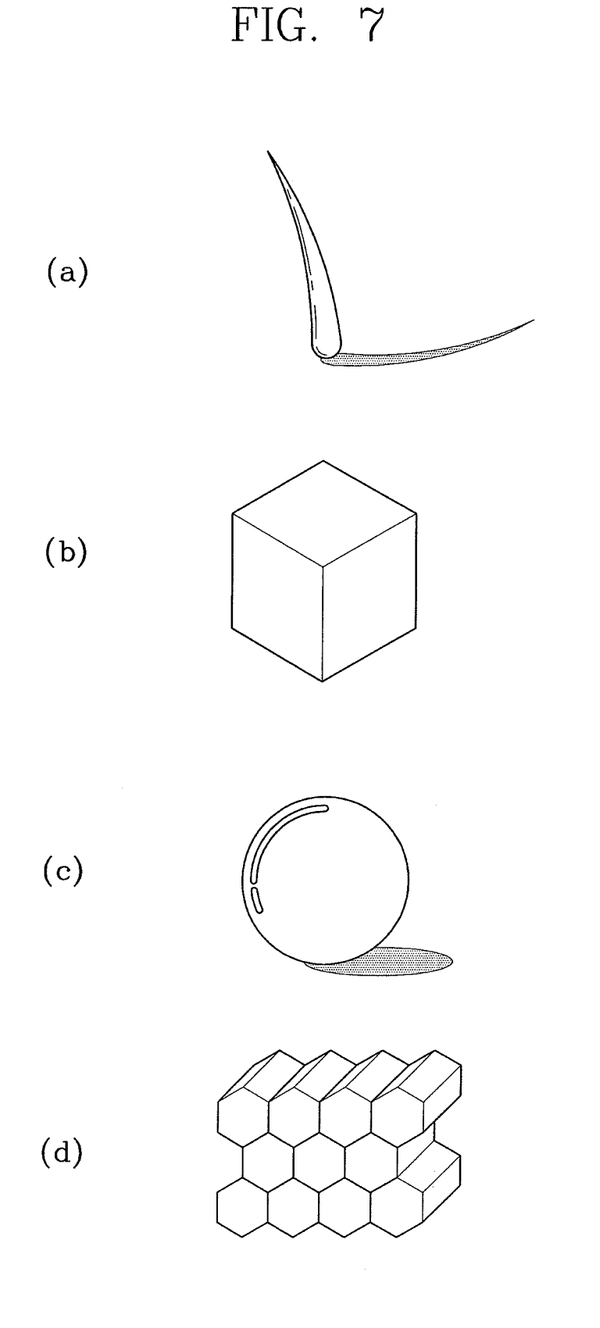
FIG. 7 is a conceptual diagram illustrating various shapes of a plurality of particles which consist of a filler of FIG. 6.

FIG. 7 is a conceptual diagram illustrating various shapes of a plurality of particles 341 which consist of the filler 340 of FIG. 6.

Referring to FIG. 7 together with FIG. 6, the plurality of particles 341 may be formed in an acicular shape (a), a polyhedron shape (b), a sphere shape (c), a honeycomb shape (d), etc. The filler 340 may consist of a plurality of particles 341 having one of the aforementioned shapes, or consist of combined particles 341 having different shapes.

When being formed in a sphere shape (c), the plurality of particles 341 may be moved to be laminated more rapidly along a surface which forms the gap 330 between the first and second members 310 and 320. This may shorten a processing time.

Alternatively, the plurality of particles 341 may be formed of a magnetic material having an attractive force therebetween. In this case, the plurality of particles 341 may have an increased bonding force therebetween, and may be reduced a phenomenon that some of the particles 341 are moved out of the gap 330 when the filler 340 is deposited. The plurality of particles 341 may be formed of Fe, Ni or Cr, or an organic or inorganic material including the same.

Figure 8:
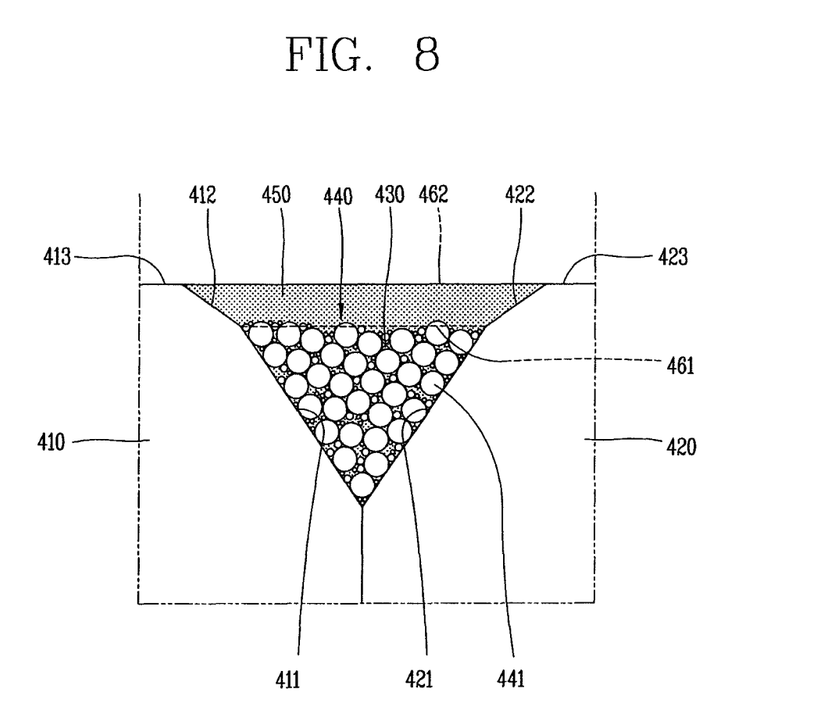
FIG. 8 is a sectional view illustrating another example of parts 'A~D' in FIGS. 2 and 3.

FIG. 8 is a sectional view illustrating another example of parts, A~D in FIGS. 2 and 3.

Referring to FIG. 8, at least one of first and second members 410 and 420 may be provided with inclined surfaces 412 and 422 having a predetermined inclined angle toward a gap 430. Along the inclined surfaces 412 and 422, the plurality of particles 441 deposited toward the gap 430 may be moved to the gap 430. More concretely, the inclined surfaces 412 and 422 guide movements of the particles 441 such that the particles 441 are filled in the gap 430.

The inclined surfaces 412 and 422 are extending from surfaces 411 and 421 which form the gap 430. As shown, the inclined surface 412 may be extending from the surface 411 which forms the gap 430 of the first member 410, and may have a gradient smaller than that of the surface 411 which forms the gap 430.

A filler 440 may be filled up to a virtual extended line 461 which connects two points between the surfaces 411, 421 which form the gap 430 between the first and second members 410, 420, and the inclined surfaces 412, 422. The particles 441 are not always filled in the gap 430 in the same manner. Therefore, it is impossible to fill the filler 440 up to the virtual extended line 461. With consideration of this, the filler 440 may be arranged to cover part of the inclined surfaces 412 and 422.

The cover layer 450 is disposed to cover the first member 410, the second member 420 and the filler 440. More concretely, as aforementioned, the cover layer 450 may be disposed to cover up to surfaces 413 and 423 of the first and second members 410 and 420, or to cover up to a virtual extended line 462 which connects two points between the surfaces 413, 423 and the inclined surfaces 412, 422.

As aforementioned with respect to FIG. 6, the cover layer 450 may include a base layer, a primer layer, a color layer and a top layer. For instance, the base layer of the cover layer 450 may be configured to fill air gaps rimmed between the plurality of particles 441.

Figure 9:
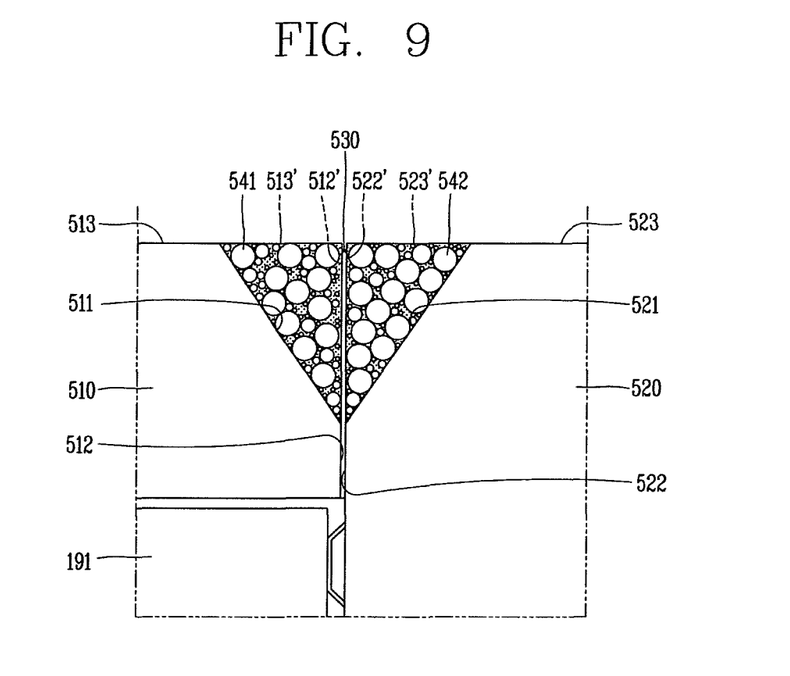
FIG. 9 is a sectional view illustrating one example of part 'E' in FIG. 3.

FIG. 9 is a sectional view illustrating one example of part 'E' in FIG. 3.

Referring to FIG. 9, a first member 510 is detachably coupled to a terminal body, and a gap 530 is formed between the first member 510 and a second member 520 adjacent to each other. As shown in FIG. 3, a battery cover 191 for covering a battery is detachably coupled to the terminal body, and the gap 530 is formed between the battery cover 191 and the rear case 102.

A filler 540 is filled in a partial or entire region of the gap 530 formed between the first member 510 and the second member 520. The filler 540 may be filled in a space formed by virtual extended lines 512' and 513' extended from surfaces 512 and 513, and a surface 511 which forms the gap 530 of the first member 510. Here, the surfaces 512 and 513 are extended from the surface 511 to two sides. Substantially, the space is formed to have a rounded end portion since the first member 510 is formed by a molding process rather than a cutting process. However, due to the filler 540, the space may have a straight end portion as if it underwent a cutting process.

The cover layer 550 is disposed to cover the first member 510 and the filler 540. And, the cover layer 550 is coupled to the first member 510 and the filler 540, thereby allowing the filler 540 and the cover layer 550 to be integrally formed with the first member 510. As aforementioned, the cover layer 550 may include a base layer, a primer layer, a color layer and a top layer. The base layer may be configured to fill air gaps formed between a plurality of particles 541, and the color layer may be formed to have the same color as the first member 510.

The above structure may be applied to the second member 520 in the same manner. That is, the filler 540 may be filled in a space formed by virtual extended lines 522' and 523' extended from surfaces 522 and 523, and a surface 521 which forms the gap 530 of the second member 520. Here, the surfaces 522 and 523 are extended from the surface 521 to two sides.

As the filler 540 is filled in the gap 530, the gap 530 may have a reduced width and depth. Consequently, the gap 530 may be blocked, and a parting line may be less revealed. This may allow the mobile terminal 100 to have a simpler and integrated configuration.

Figure 10:
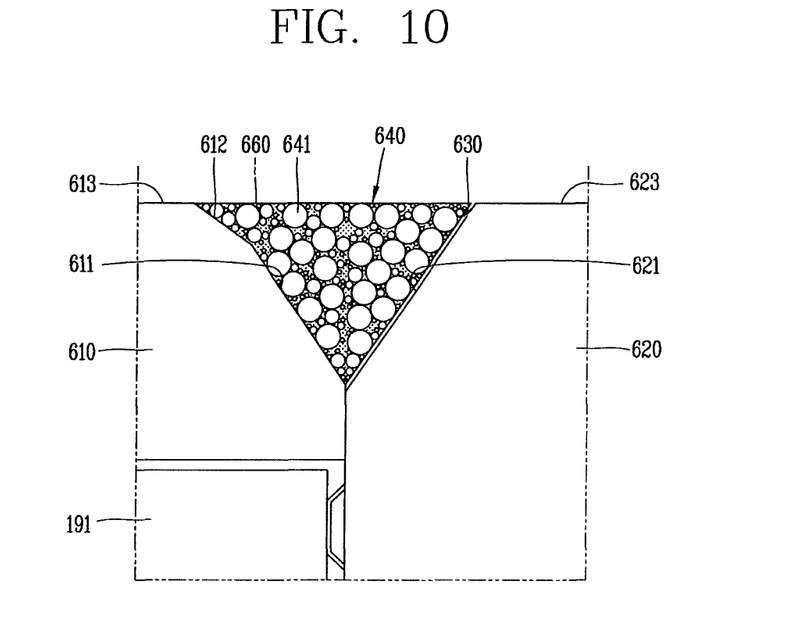
FIG. 10 is a sectional view illustrating another example of part 'E' in FIG. 3.

FIG. 10 is a sectional view illustrating another example of part 'E' in FIG. 3.

Referring to FIG. 10, a first member 610 is provided with an inclined surface 612 extending from a surface 611 which forms a gap 630, and inclined with a predetermined angle toward the gap 630. The inclined surface 612 guides movements of a plurality of the particles 641 such that the particles 641 are filled in the gap 630. This may allow a filler 640 to be filled in the gap 630 more easily.

The filler 640 is filled in the gap 630 between the first member 610 and a second member 620. The filler 640 may be configured to cover a surface 621 which forms the gap 630 of the second member 620. For instance, the filler 640 may be filled in a space formed by the inclined surface 612, the surfaces 611 and 612 which form the gap 630 of the first and second members 610 and 620, and a virtual extended line 660 which connects outer surfaces 613 and 623 of the first and second members 610 and 620.

The cover layer 650 is disposed to cover the first member 610 and the filler 640. And, the cover layer 650 is coupled to the first member 610 and the filler 640, thereby allowing the filler 640 and the cover layer 650 to be integrally formed with the first member 610. The cover layer 650 may be configured to fill air gaps formed between the plurality of particles 641, and may be formed to have the same color as the first member 610.

The cover layer 650 may be configured to cover up to a virtual extended line 660 which connects the outer surfaces 613 and 623 of the first and second members 610 and 620. As the first member 610, the second member 620 and the cover layer 650 form the same plane, the different members may be sensed as one integrated member in a visual or tactile manner. Differently from the structure aforementioned in FIG. 9, the filler 640 and the cover layer 650 for blocking the gap 630 are formed only at the first member 610. This may simplify the entire processes.

Figure 11:
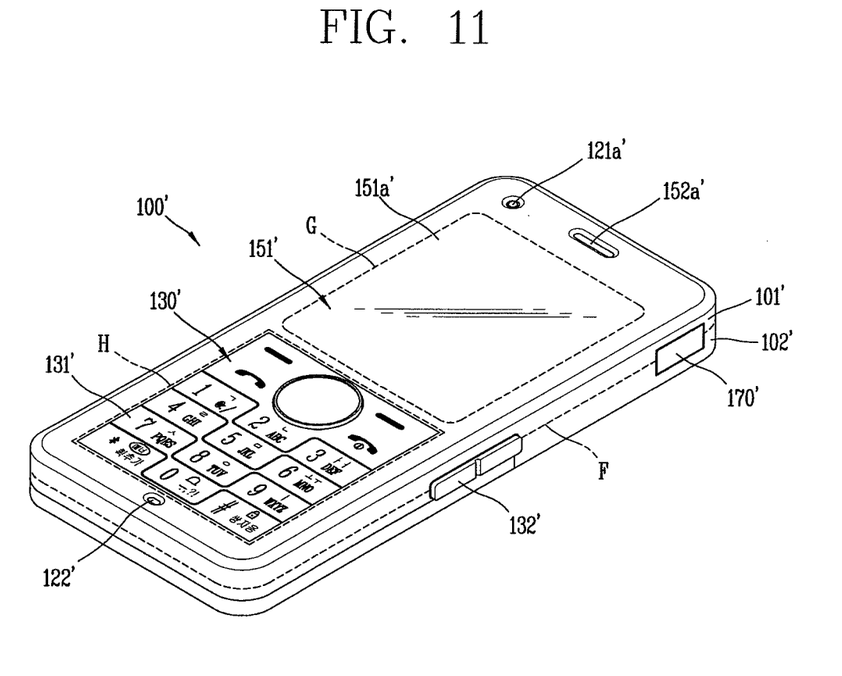
FIG. 11 is a front perspective view illustrating another example of a mobile terminal according to the present invention.
Figure 12:
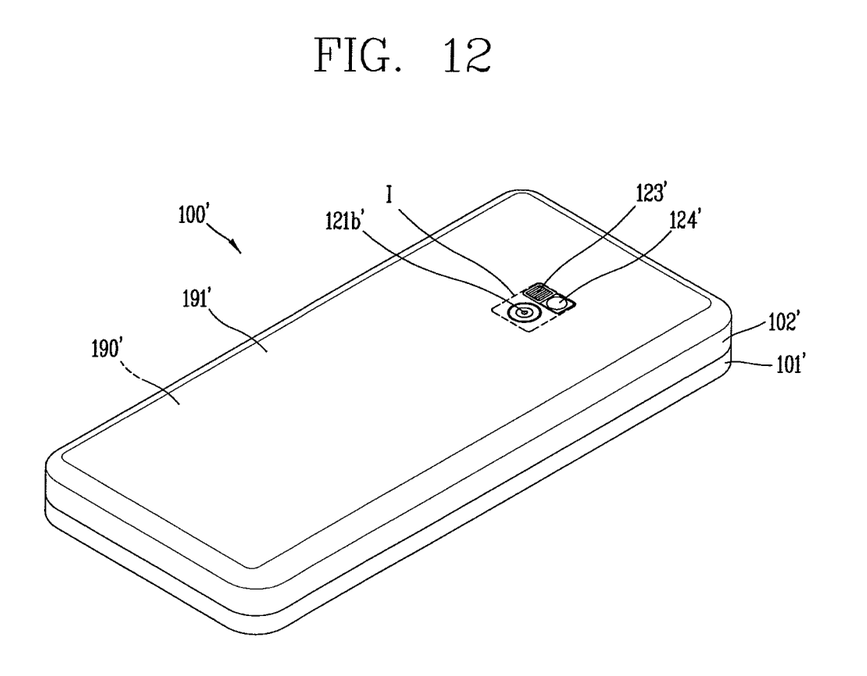
FIG. 12 is a rear perspective view of the mobile terminal of FIG. 11.

FIG. 11 is a front perspective view illustrating another example of a mobile terminal 100' according to the present invention, and FIG. 12 is a rear perspective view of the mobile terminal 100' of FIG. 11.

Referring to FIGS. 11 and 12, the mobile terminal 100' is provided with a bar-type terminal body. Front and rear cases 101' and 102' implement the appearance of the terminal body, and form a space for accommodating components therein.

A display unit 151' and a user input unit 130' are disposed on a front surface of the terminal body. The display unit 151' may be provided with a window 151a' for covering thereof, and the user input unit 130' may be provided with a keypad 130a' having a dome switch structure. A recessed space is formed on one surface of a front case 101' such that the window 151a' and the keypad 130a' are mounted therein.

The aforementioned structure for blocking a gap may be applied to a gap between the front case 101' and the rear case 102' (F), a gap between the front case 101' and the window 151a' (G), a gap between the front case 101' and the keypad 130a' (H), and a gap between the battery cover 191' and the camera 121b' (I).

Figure 13:
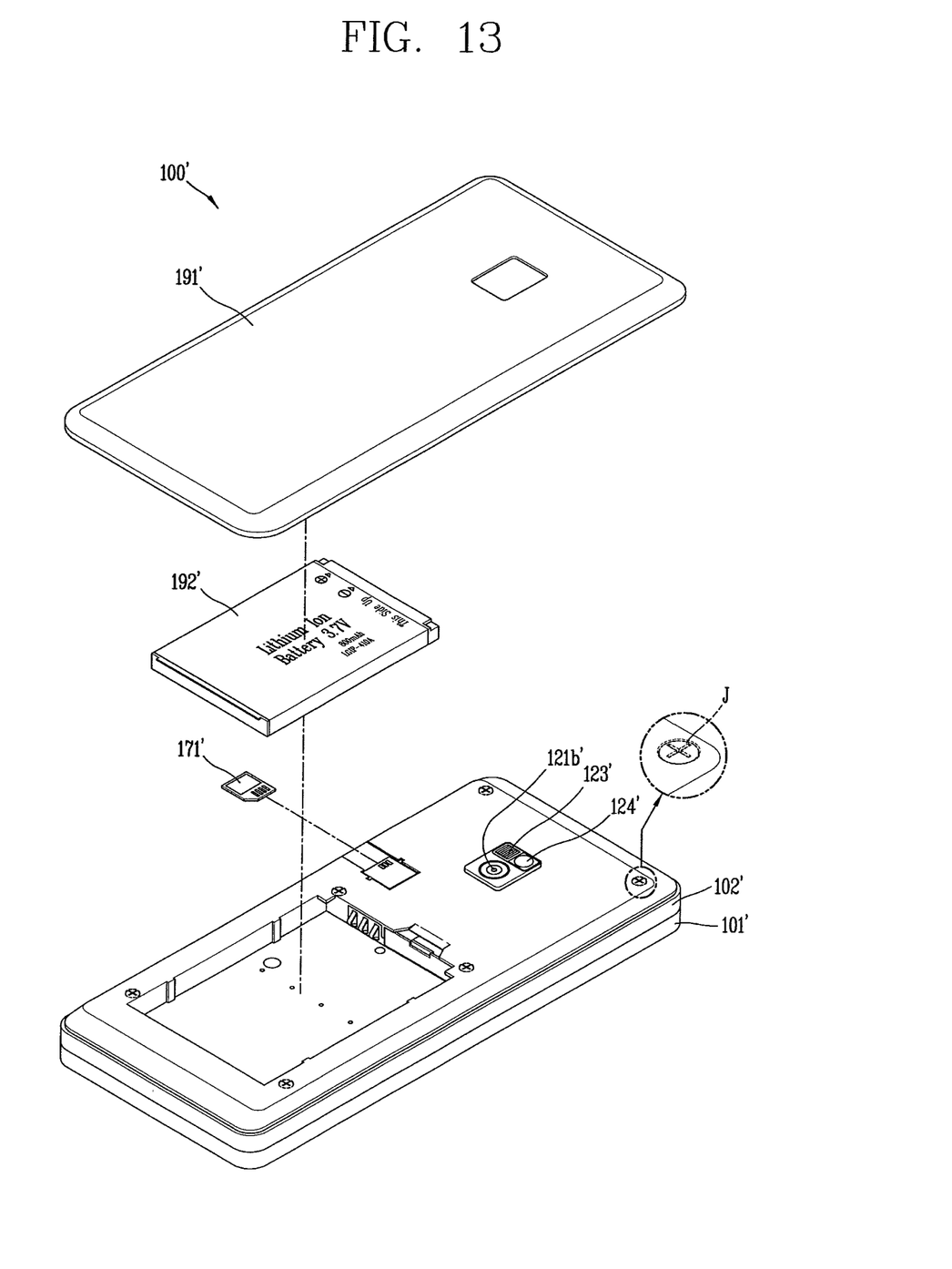
FIG. 13 is an exploded perspective view of the mobile terminal of FIG. 12.

FIG. 13 is an exploded perspective view of the mobile terminal 100' of FIG. 12.

Referring to FIG. 13, the mobile terminal 100' includes the front case 101', the rear case 102' and the battery cover 191'. Each component is mounted at an inner space formed by the front and rear cases 101' and 102', and the battery cover 191' is detachably coupled to the rear case 102'.

On a rear surface of the rear case 102', mounted is the camera 121b', and detachably mounted are a battery 192', an identification module 171' (e.g., SIM card), etc.

The battery cover 191' is configured to cover a partial or entire region of the rear surface of the rear case 102'. The battery cover 191' is arranged to cover the battery 192', the identification module 171', etc., and prevents movements of these components.

A coupling member 720 is insertion-fixed to the rear case 102'. For instance, the coupling member 720 may be inserted into the terminal body in a thickness direction, thereby coupling the front and rear cases 101' and 102' to each other. The coupling member 720 is not exposed to the outside since it is covered with the battery cover 191'. However, when the battery cover 191' is detached from the rear case 102', the rear surface of the rear case 102' is exposed to the outside. This may require a structure to block a coupled part of the coupling member 720.

Figure 14:
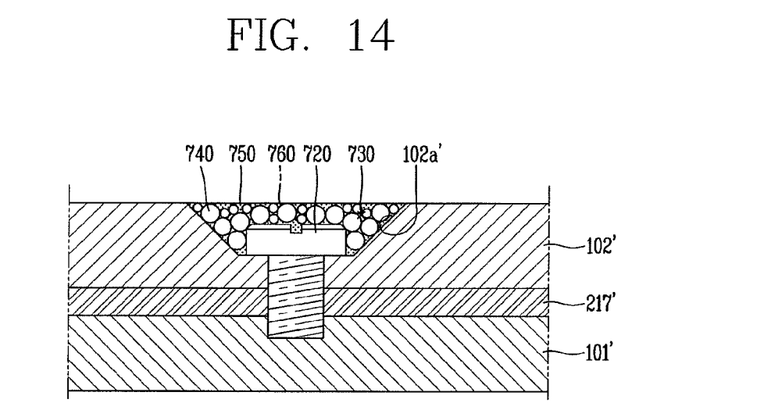
FIG. 14 is a sectional view illustrating one example of part 'J' in FIG. 13.

FIG. 14 is a sectional view illustrating one example of part 'J' in FIG. 13.

Referring to FIG. 14, the coupling member 720 is inserted into the terminal body, thereby coupling the front and rear cases 101' and 102' to each other. A printed circuit board 217', one example of the controller 180 (refer to FIG. 1) may be fixed at a precise position between the front and rear cases 101' and 102'.

The coupling member 720 is inserted into the rear case 102' toward the front case 101'. And, the rear case 102' is provided with a recessed portion 102a' on one surface thereof such that part of the coupling member 720 is mounted therein. Under this configuration, a gap 730 is formed between the rear case 102' and the coupling member 720.

As shown, the rear case 102' and the coupling member 720 are formed to have a step from each other. A filler 740 is filled in the gap 730 so as to block the gap 730 formed between the rear case 102' and the coupling member 720. In order to completely block the coupling member 720, the filler 740 may be filled in a space formed by a virtual extended line 760 formed along an outer surface of the rear case 102'.

The cover layer 750 is arranged to cover the filler 740. The cover layer 750 may be configured to cover up to a virtual extended line which connects end portions of the rear case 102' and the coupling member 720, thereby exposing an outer surface of the coupling member 720. Alternatively, the cover layer 750 may be configured to cover up to the virtual extended line 760 formed along the outer surface of the rear case 102', thereby completely blocking the coupling member 720. In order to prevent the coupling member 720 from being exposed to the outside, the cover layer 750 may be formed to have the same color as the rear case 102'.

Figure 15:
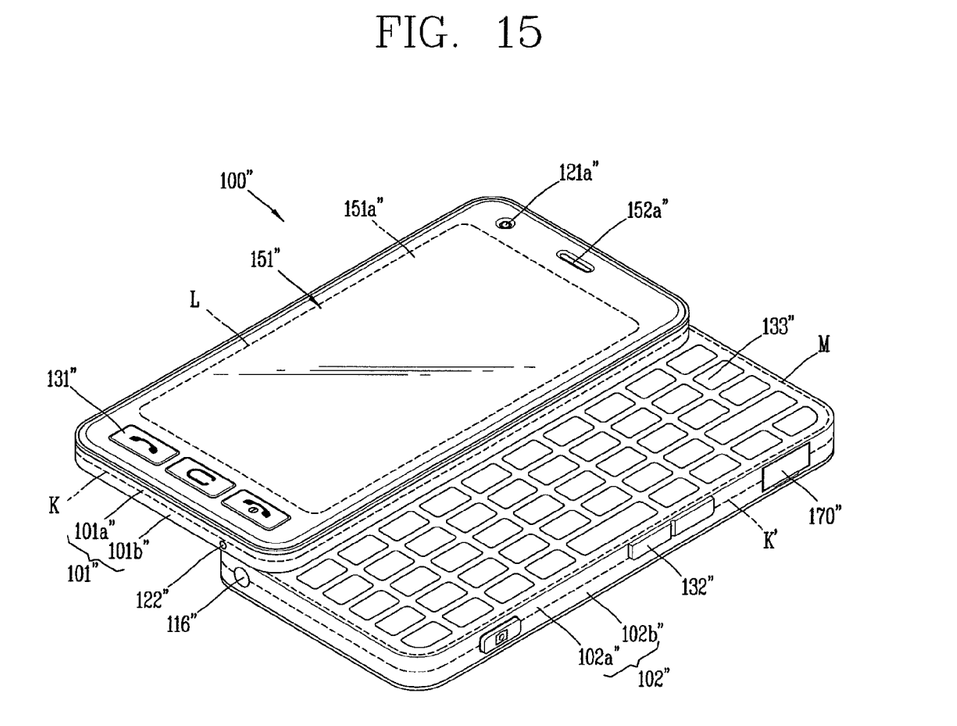
FIG. 15 is a perspective view illustrating another example of a mobile terminal according to the present invention.

FIG. 15 is a perspective view illustrating another example of a mobile terminal 100" according to the present invention.

Referring to FIG. 15, the mobile terminal 100" includes first and second bodies 101" and 102" coupled to each other so as to perform a relative motion. The first and second bodies 101" and 102" may consist of front cases 101a", 102a" and rear cases 101b", 102b" which form a space for accommodating components therein.

The first body 101" may be provided with a display unit 151", a camera 121a", a sound output module 152a", a first user input unit 131a", a microphone 122", etc. The display unit 151" may be disposed to occupy most parts of a main surface of the first body 101". On a region adjacent to one end of the display unit 151", disposed are the sound output module 152a" and the camera 121a". On a region adjacent to another end of the display unit 151", disposed are the first manipulation unit 131a" and the microphone 122".

A second user input unit 132", an interface unit 170", etc. may be mounted at the second body. On a main surface of the second body 102", may be disposed a third user input unit 133", e.g., a QWERTY type keypad.

The aforementioned structure for blocking a gap may be applied to a gap between the front cases 101", 102a" and the rear cases 102a", 102b" of the first and second bodies 101", 102" (K, K'), a gap between the front case 101a" and the window 151a"(L), and a gap between the front case 102a" and the third user input unit 133" (M).

In the present invention, the filler may be disposed to block a gap formed between different members, and the cover layer may be disposed to cover the members and the filler. This may provide a simpler and integrated mobile terminal due to a blocked gap.

Furthermore, at least one of the members may be provided with the inclination surface for guiding a movement of the filler to the gap. This may allow the filler to be more easily filled in the gap.

The foregoing embodiments and advantages are merely exemplary and are not to be construed as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention thus being described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mobile terminal comprising:
   a terminal body;
   a first member disposed on an inner or outer surface of the terminal body, the first member having a first surface;

a second member located adjacent to the first member, the second member having a second surface facing the first surface, the first and second surfaces defining a gap therebetween;

a filler located in the gap to at least partially block the gap; and a cover layer configured to cover a portion of the first member, a portion of the second member and the filler, wherein at least one of the first and second members has an inclined surface extending at a predetermined inclined angle toward the gap, wherein the filler is formed of a plurality of particles located in the gap so as to at least partially block the gap, and wherein the cover layer includes:
- a base layer covering the portion of the first member, the portion of the second member and the filler;
- a color layer covering the base layer;
- a primer layer located between the base layer and the color layer; and
- a top layer covering the color layer so as to protect the color layer.

2. The mobile terminal of claim 1, wherein the inclined surface extends from one of the first and second surfaces.

3. The mobile terminal of claim 1, wherein the filler is disposed to cover the inclined surface.

4. The mobile terminal of claim 1, wherein the filler includes at least one organic material selected from an organic group including a gel, a lake, and a compound.

5. The mobile terminal of claim 1, wherein the filler includes at least one inorganic material selected from an inorganic group including a metal, a grin, and a rubber.

6. The mobile terminal of claim 1, wherein the plurality of particles have different sizes such that a porosity of the gap is minimized.

7. The mobile terminal of claim 1, wherein the plurality of particles are formed in a spherical shape.

8. The mobile terminal of claim 1, wherein the plurality of particles are formed of a magnetic material having an attractive force therebetween.

9. The mobile terminal of claim 1, wherein the base layer is arranged to fill air gaps formed between the plurality of particles.

10. The mobile terminal of claim 1, wherein the first and second members are first and second housings, respectively, for accommodating components therein, and
wherein the filler is located in the gap so as to block the gap between the first and second housings.

11. The mobile terminal of claim 1, wherein the first member is a window disposed to cover a display located in the terminal body,
the second member is a casing for accommodating the window therein, and
the filler is located in the gap so as to block the gap between the window and the casing.

12. The mobile terminal of claim 1, wherein the first member is a casing which forms a space for accommodating components therein,
the second member is a coupling member coupled to the casing, and
the filler is located in the gap so as to cover the gap between the casing and the coupling member, and to cover the coupling member.

* * * * *